(12) United States Patent
Hoppert

(10) Patent No.: US 10,552,194 B2
(45) Date of Patent: Feb. 4, 2020

(54) VIRTUALIZATION OPERATIONS FOR DIRECTLY ASSIGNED DEVICES

(71) Applicant: Microsoft Technology Licensing, LLC, Redmond, WA (US)

(72) Inventor: Hadden Mark Hoppert, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 47 days.

(21) Appl. No.: 15/790,598

(22) Filed: Oct. 23, 2017

(65) Prior Publication Data

US 2019/0121656 A1    Apr. 25, 2019

(51) Int. Cl.
| | | |
|---|---|---|
| G06F 9/455 | (2018.01) | |
| G06F 1/3287 | (2019.01) | |
| G06F 1/3246 | (2019.01) | |
| G06F 9/4401 | (2018.01) | |

(52) U.S. Cl.
CPC ........ *G06F 9/45558* (2013.01); *G06F 1/3246* (2013.01); *G06F 1/3287* (2013.01); *G06F 9/4418* (2013.01); *G06F 2009/45575* (2013.01)

(58) Field of Classification Search
None
See application file for complete search history.

(56) References Cited

U.S. PATENT DOCUMENTS

| | | | | |
|---|---|---|---|---|
| 8,464,019 B2* | 6/2013 | Oshida | ........ | G06F 9/5077 711/173 |
| 8,856,782 B2* | 10/2014 | Ghosh | ........ | G06F 9/45533 718/1 |
| 8,984,123 B2* | 3/2015 | Machida | ........ | G06F 11/1438 709/216 |
| 9,069,591 B1* | 6/2015 | Beloussov | ........ | G06F 9/45558 |

(Continued)

FOREIGN PATENT DOCUMENTS

| | | |
|---|---|---|
| WO | 2015095427 A1 | 6/2015 |
| WO | 2016032857 A1 | 3/2016 |

OTHER PUBLICATIONS

Microsoft, "Processor Compatibility Mode in Hyper-V", 2016, Published by Microsoft Docs (Year: 2016).*

(Continued)

*Primary Examiner* — Hossain M Morshed

(57) ABSTRACT

Embodiments relate to enabling state manipulation of virtual machines (VMs) that have directly assigned hardware devices. A hypervisor manages execution of a VM with a guest operating system. The hypervisor directly assigns a physical (non-virtual) hardware device to the VM, such that the VM has exclusive use of the hardware device and the guest operating system uses the hardware without needing virtualization abstraction/mapping by the hypervisor. When the VM needs to be pauses, suspended, restored, or similarly manipulated, the hypervisor communicates with the VM to cause the guest operating system to perform whatever operations might be necessary by the hardware device. The hypervisor and VM/guest may communicate with a variety (Continued)

of mechanisms, such as a host driver communicating with a guest driver, a virtual bus service backed by a hardware bus of the computer, a virtual bus channel, or the like.

20 Claims, 7 Drawing Sheets

(56) References Cited

U.S. PATENT DOCUMENTS

| | | | | |
|---|---|---|---|---|
| 9,361,145 | B1* | 6/2016 | Wilson | G06F 9/45558 |
| 2005/0198633 | A1* | 9/2005 | Lantz | G06F 9/45558 718/1 |
| 2011/0179414 | A1* | 7/2011 | Goggin | G06F 3/061 718/1 |
| 2012/0151483 | A1* | 6/2012 | Belay | G06F 9/45558 718/1 |
| 2012/0254862 | A1* | 10/2012 | Dong | G06F 9/4856 718/1 |
| 2013/0174151 | A1* | 7/2013 | Nakajima | G06F 9/461 718/1 |
| 2014/0245294 | A1* | 8/2014 | Kaul | G06F 9/45558 718/1 |
| 2015/0067681 | A1* | 3/2015 | Naseh | H04L 41/0803 718/1 |
| 2016/0350244 | A1* | 12/2016 | Tsirkin | G06F 13/28 |

OTHER PUBLICATIONS

Veritas, "Veritas NetBackup™ for Hyper-V Administrator's Guide", Sep. 2017, Veritas.com (Year: 2017).*
Mike, "Hyper-V: What will happen with my VMs when I restart Hyper-V host", http://mikerodionov.com/2013/01/hyper-v-what-will-happen-with-my-vms-when-i-restart-hyper-v-host/, Published on: Jan. 22, 2013, 2 pages.
Ober, Mike, "Is it better to save VM state or shutdown the Guest OS when restarting the host?", https://community.spiceworks.com/topic/144695-is-it-better-to-save-vm-state-or-shutdown-the-guest-os-when-restarting-the-host, Published on: Jun. 22, 2011, 1 page.
"International Search Report and Written Opinion Issued in PCT Application No. PCT/US2018/055758", dated Jan. 22, 2019, 13 Pages (MS# 402524-WO-PCT).
Zhai, et al., "Live Migration with Pass-through Device for Linux VM", In Proceedings of the Linux Symposium, vol. Two, Jul. 1, 2008, pp. 261-269.

* cited by examiner

VIRTUALIZATION OPERATIONS FOR DIRECTLY ASSIGNED DEVICES

BACKGROUND

Among the many forms of computer virtualization, machine or system virtualization has become common due to many known advantages. System virtualization involves abstracting the hardware resources of a computer and presenting the computer as virtual machines. A layer of software referred to as a hypervisor or virtual machine monitor (VMM) runs directly on the hardware of a computer. The hypervisor manages access to the hardware of the computer by virtual machines (VMs), which are also known as partitions, domains, or guests. Each VM is a software environment or construct capable of hosting its own guest operating system. The hypervisor manages sharing of the computer's hardware, in particular processing hardware and memory, by the VMs. The presence of a layer of software—the hypervisor—between the guest operating system and the computer hardware is mostly transparent to the guest operating system.

A developing technology for machine virtualization is the ability to directly assign hardware devices to VMs. This technology, referred to as direct device assignment (DDA), allows a virtualization layer (a term discussed in the Detailed Description) to hand over a hardware device to a VM and then the VM uses the hardware device directly without requiring substantial (if any) involvement of the virtualization layer to access and use the hardware device. That is, the hardware device is used by the VM without requiring virtualization abstraction or mapping by the virtualization layer, and, in some cases, neither the host nor other VMs use the hardware device, even when the virtualization layer has paused the VM or has not scheduled CPU time for the VM.

While DDA offers fast performance for the VM, there are disadvantages that only the instant inventor has appreciated. Most machine virtualization systems have functionality to control the execution state of VMs. Typical operations to control a VM's state include pausing, saving, restoring, migrating, and the like. Such operations are particularly useful in cloud environments. A cloud provider might need to alter the state of a VM transparently to the tenant or customer. For instance, a host machine might require a security update to the host/virtualization software. As only the inventor has appreciated, rather than informing a tenant or customer that a VM needs to be saved or shut down to allow a reboot of the host, the cloud provider would prefer to be able to suspend a tenant's VM transparently so that the host can be updated and rebooted without significantly interfering with operations of the tenant's VM and without requiring action by the tenant. Although it is theoretically possible for a virtualization system to preserve or pause the hardware state of a VM that is virtualized by the hypervisor (see, e.g., US patent publication 2014/0157264), it has not been possible for a virtualization system to perform such operations on hardware directly assigned to a VM and out of the purview of the hypervisor. That is, operations to control a VM's state have not been able to be performed on VMs with directly assigned hardware since the directly assigned device is owned by the VM.

There is a need to enable a machine virtualization system to control the state of a VM that takes into account the presence of hardware directly assigned to the VM.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to enabling state manipulation of virtual machines (VMs) that have directly assigned hardware devices. A hypervisor manages execution of a VM with a guest operating system. The hypervisor directly assigns a physical (non-virtual) hardware device to the VM, such that the VM has exclusive use of the hardware device and the guest operating system uses the physical hardware device without needing virtualization abstraction/mapping by the hypervisor. When the VM needs to be paused, suspended, restored, or similarly manipulated, the hypervisor communicates with the VM to cause the guest operating system to perform whatever operations might be necessary by the hardware device. The hypervisor and VM/guest may communicate with a variety of mechanisms, such as a host driver communicating with a guest driver, a virtual bus service backed by a hardware bus of the computer, a virtual bus channel, or the like.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
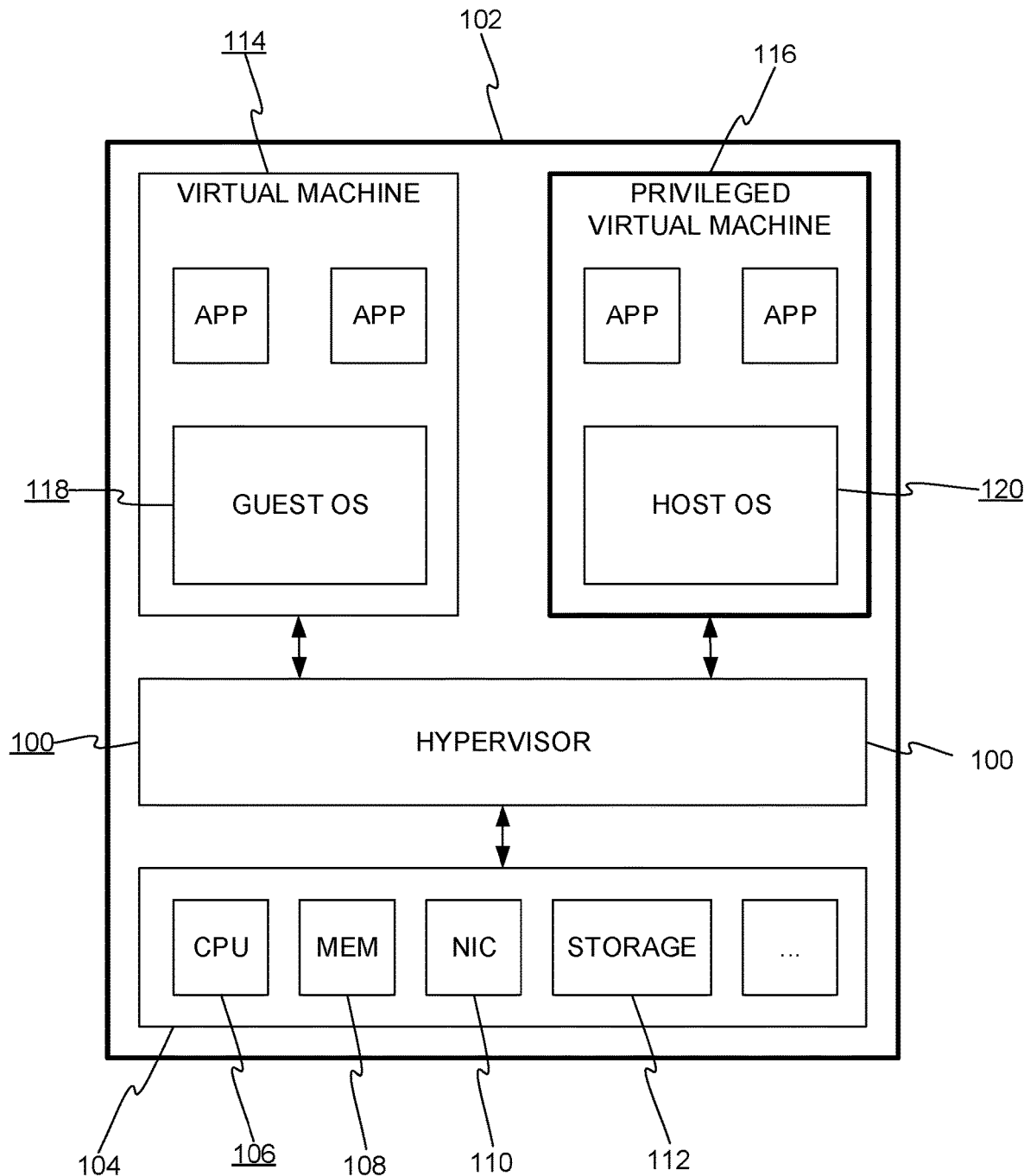
FIG. 1 shows an example virtualization environment that includes a known type of hypervisor.

FIG. 1 shows an example virtualization environment that includes a known type of hypervisor 100. A computer 102 has hardware 104, including a central processing unit (CPU) 106, memory 108, a network interface card (NIC) 110, non-volatile storage 112, and other components not shown, such as a bus, a display and/or display adapter, etc. The hypervisor 100 manages and facilitates execution of virtual machines (VMs) 114, 116. Each virtual machine 114, 116 typically has virtualized devices including a virtual disk within which a guest/host operating system 118, 120 is stored. Machine or system virtualization is provided by the hypervisor 100 cooperating with a host operating system 120 that executes in a privileged VM 116.

The tasks of virtualization may be distributed between the hypervisor 100 and the host operating system 120 in known ways. In some cases, the host operating system 120 might consist of only minimal virtualization elements such as tools and user interfaces for managing the hypervisor 100. In other cases, the host operating system 120 might include one or more of: device virtualization management, inter-VM communication facilities, running device drivers, starting, or stopping other VMs. In some embodiments, virtualization may mostly take place within the hypervisor kernel (or a virtualization module that plugs into a stock kernel) and there is no privileged VM 116.

Figure 2:
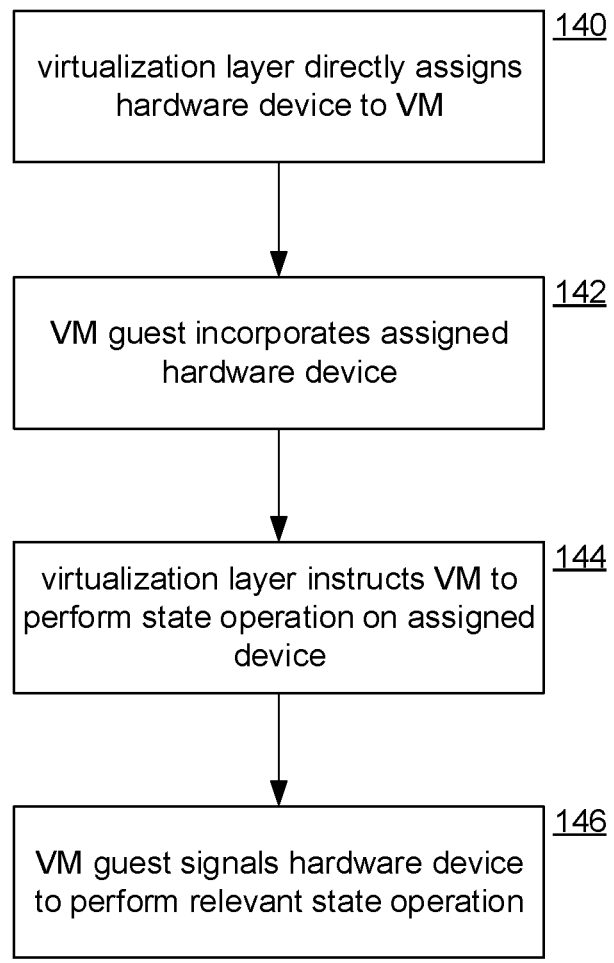
FIG. 2 shows a general process for facilitating state operations on VMs that have directly assigned hardware devices.

FIG. 2 shows a general process for facilitating execution-state operations on VMs that have directly assigned hardware devices. It is assumed that a host computer has a virtualization layer ("hypervisor" hereafter), a VM 114, and a hardware device directly assignable to the VM. The hardware device may be any type of device, including a graphics processing unit (GPU), a storage device such as a solid state drive (SSD), a NIC, or others. The hardware device may be a device locally attached to a physical bus of the host 102 (e.g., peripheral connect interface (PCI) or PCI-e), a device accessible via a data network, etc.

At step 140 the hypervisor 100 directly assigns a hardware device to the VM 114. As described below with reference to FIG. 3, this may involve steps such as providing the VM 114 with an identifier of the device, and registering an association of the device with the VM 114. At step 142 the guest operating system 118 of the VM 114 responds to the device assignment by incorporating the device into its device management stack, for instance connecting the device to its virtual bus. At step 144, after the hardware device has been attached to the VM 114 and the VM 114 is directly using the hardware device, the virtualization layer instructs the VM to perform a state operation such as pause, save, restore, or the like. The request can be presented and implemented in different ways that are described below. For example, an appropriate signal can be sent to the VM on a virtual bus that provides communication between the hypervisor and VMs. At step 146 the VM's guest operating system responds to the signal from the virtualization layer by performing the relevant state operation on the directly assigned hardware device.

Figure 3:
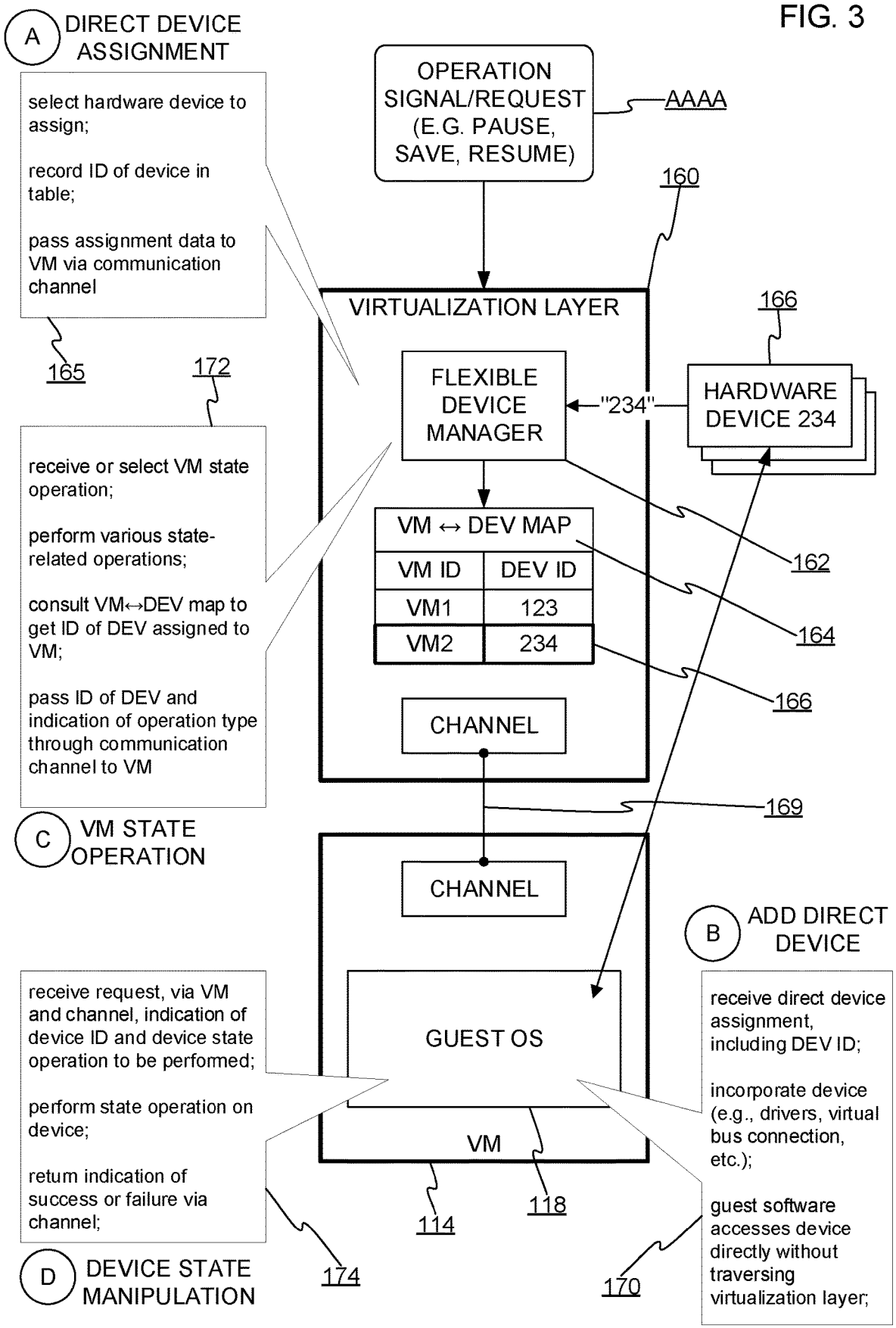
FIG. 3 shows how a VM and virtualization layer cooperate to enable state operations on the VM to be carried out on directly assigned hardware.

FIG. 3 shows how the VM 114 and virtualization layer 160 cooperate to enable state operations on the VM 114 to be carried out on directly assigned hardware. The virtualization layer 160 is any combination of type-I hypervisor or virtualization kernel module and possibly other privileged components such as a host operating system 120. The virtualization layer may include a flexible device manager 162. If present, the flexible device manager 162 handles and tracks direct assignment of hardware devices to VMs. Although directly assigned hardware devices are used by a VM and not the host, the host or virtualization layer 160 still needs to know what hardware has been directly assigned so that it can avoid conflicts with the VM to which it has been assigned. Therefore, the flexible device manager 162 may maintain a device map 164 to keep track of which hardware devices have been assigned to which VMs.

Initially, the virtualization layer 160 assigns a hardware device 166 to the VM 114. An assignment process 165 (stage A) is performed. The hardware device 166 is selected and a device identifier (ID) is obtained from the hardware device 166. The flexible device manager 162 adds an entry 168 to the device map 164. The new entry 168 includes the device ID and an ID of the VM 114. The entry 168 indicates that the hardware device 166 is directly assigned and indicates which VM it is assigned to. As part of the assignment process 166, the flexible device manager 162 communicates with the VM 114 via a channel 169 of a virtual bus that handles hypervisor-VM and VM-VM communications. The flexible device manager 162 sends the device ID to the VM. The virtualization layer 160 also takes steps to assign the hardware device 166 to the VM, for instance signaling a virtual computer bus of the VM that a new device is available, which allows the guest operating system to add the hardware device 166.

In response to the direct-assignment signal or message from the virtualization layer, the VM 114 performs an attachment process 170 (stage B). In effect, the VM and the guest operating system add the hardware device in the normal way that devices are added; adding the device to a virtual computer bus (e.g., a virtual Peripheral Connect Interface (PCI)) device tree, setting up a device driver if needed, etc. The guest operating system is then able to directly and exclusively access and use the hardware device 166.

Once the VM and guest operating system have begun using the directly assigned hardware device 166, VM state managing operations will be needed for various reasons. Execution state operations such as pausing, saving, restoring, and migrating VMs are well known and critical to the role that VMs play in managing computing resources. However, as discussed in the Background, such operations have not been practical for VMs with directly assigned devices.

When a VM state operation is needed, a state operation process 172 (stage C) is started at the virtualization layer. The state operation may be initiated in a number of ways. A network controller or cloud fabric might send a message to the host indicating which operation is to be performed on which VM. The host might initiate the operation based on a user command or a trigger event. In any case, the virtualization layer may itself perform various functions as part of the VM state operation. Such previously-known functions for hardware virtualized for the target VM include saving or hydrating memory of the target VM and capturing or restoring CPU state of the target, to name a few. A new state-management function performed by the virtualization layer is checking whether the target VM has a directly assigned device. The ID of the target VM can be searched for in the device map 164; its presence indicates that the target VM has directly assigned hardware and therefore further steps are to be performed. The virtualization layer then sends a message via the virtual bus channel 169 to the VM. At the least, the message indicates what type of operation is to be performed; e.g., save state, restore/load state, pause, change power state, etc. Optionally, the message (or a related message) includes an identifier from the device map 164 of any hardware device associated with the target VM. Whether the directly attached hardware device needs to be identified to the VM may depend on whether the VM or guest operating system is able to identify directly attached devices. If the guest is able to do so, it will be sufficient for the virtualization layer to merely indicate the type of state operation that is to be executed.

The target VM responds to a state operation signal from the virtualization layer and the channel 169 by performing a device state altering process 174. If the message from the virtualization layer includes the ID of the hardware device then the guest operating system can use that ID to identify the device. If the guest operating system is able to identify directly attached hardware then the device ID from the virtualization layer may be omitted. The guest operating system might recognize a directly assigned hardware device by the way it is connected, how it was installed, or other signs. The guest operating system communicates with the target hardware device through the same communication path used for ordinary cooperation with the hardware device, for instance through a device/storage stack that includes a device driver, a virtual PCI connection, etc.

The functionality of the hardware device that is invoked by the guest operating system will depend on the individual device and the type of operation to be performed. Some types of hardware devices may have virtualization support and may readily perform functions such as pausing execution, dumping state to a memory buffer, restoring state from memory, syncing to a known state, syncing multiple parts of a device, etc. For instance, devices that conform with virtualization standards such as Intel VT-D™ will be convenient to use. Devices that comply with power standards such as ACPI (Advanced Configuration and Power Interface) may also be convenient, as certain power states may be entered to accommodate virtualization operations such as pausing or suspending a VM. The availability and nature of such support may dictate the communication path and content of requests passed from the virtualization layer to the target VM. New devices with new execution-state functionality are emerging and may also be used. Directly assignable devices may also include physical portions of a physical device that are individually assignable. For example, some network interfaces can be divided into multiple sub-devices each of which may be directly assigned.

Figure 4:
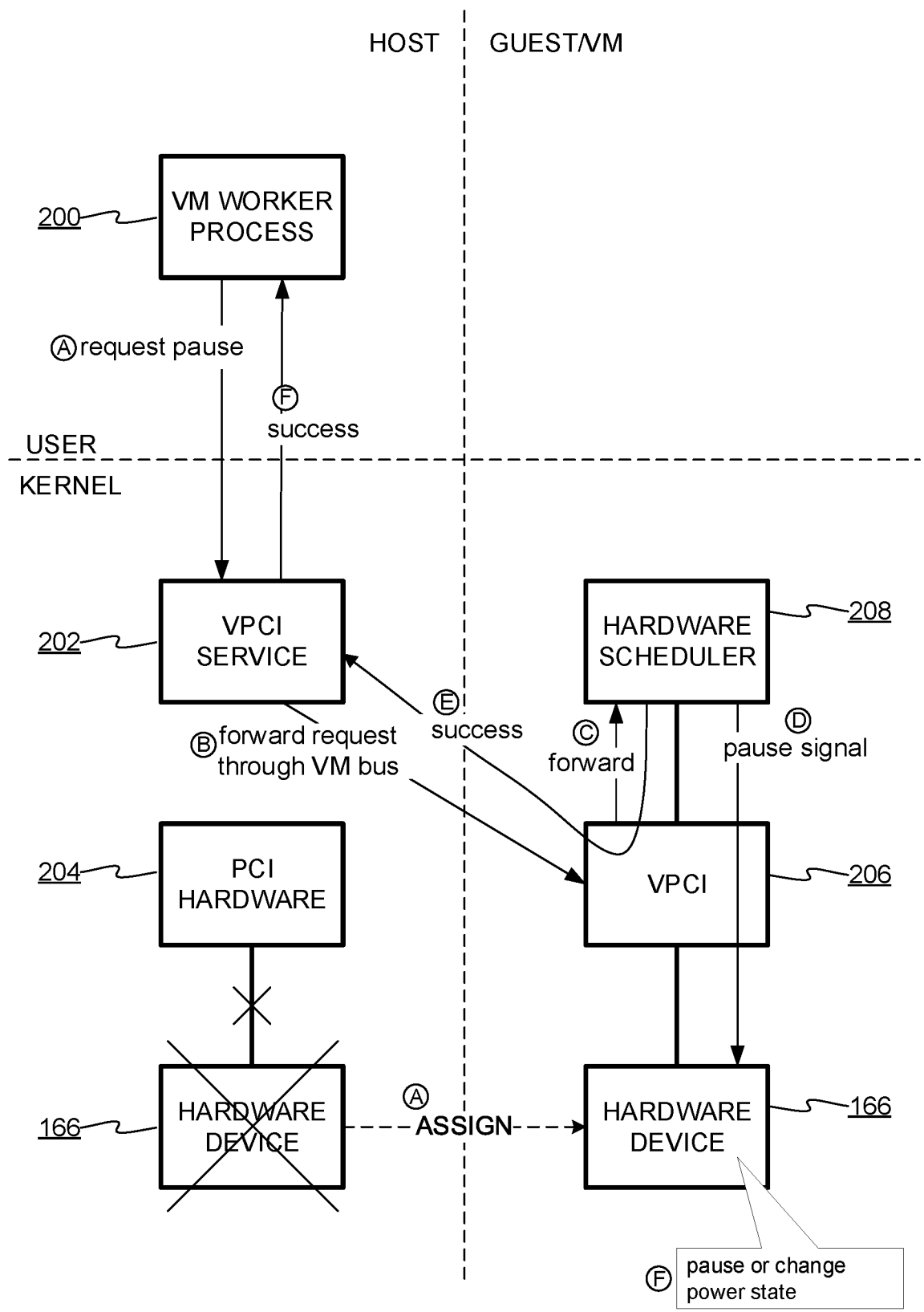
FIG. 4 shows an embodiment suitable for some types of hardware devices.

FIG. 4 shows an embodiment suitable for some types of hardware devices. A VM worker process 200 is managed by the virtualization layer (e.g., as a hypervisor thread or a thread in a host operating system). The VM worker process 200 could be any type of object that a virtualization system uses to represent VMs. Initially, a device driver on the host side reports to the virtualization layer the availability of the directly assignable hardware device 166. A virtual PCI (vPCI) service 202 manages virtualization mapping between PCI hardware 204 and a vPCI device 206. Accessibility to the PCI hardware 204 via the vPCI service 202 enables the VM worker process 200 to inject PCI communications into the vPCI device 206. When the VM worker process 200 determines that a state operation is needed for the target VM, the worker process 200 formulates a message for the vPCI service 202, which, given its PCI-vPCI mapping role, is able to inject PCI communications into the vPCI device 206. To the vPCI device 206, the request appears like any other PCI message. In one embodiment, the request is addressed to the hardware device 166 by the vPCI service 202 and/or the VM worker process 200 using information from a record of the hardware device 166. In another embodiment, the request is passed through the PCI/vPCI channel to a hardware scheduler 208 which is in charge of scheduling operations of the hardware device 166. The hardware scheduler 208 may be helpful for avoiding conflicts with use of the hardware device 166 by the guest operating system. In either case, the request that is passed to the hardware device 166 identifies the type of operation to be performed (e.g., a change to a particular power state such as a hot or cold state).

The hardware device 166 receives the request, attempts to perform the requested state operation, and then outputs a return value (e.g., a success/failure code) and possibly other return data through the same communication pathway. If the VM worker process 200 receives back an indication of success, then the VM worker process 200 might continue with other operations directed to execution state of the VM, for instance, capturing or restoring memory, virtual CPU state, performing a live migration, or others. Although the hardware device 166 is opaque to the virtualization layer when it has been directly assigned, the awareness of the hardware device 166 and the ability to communicate with it via a virtualized bus enables the virtualization layer to send instructions to the hardware device 166.

Figure 5:
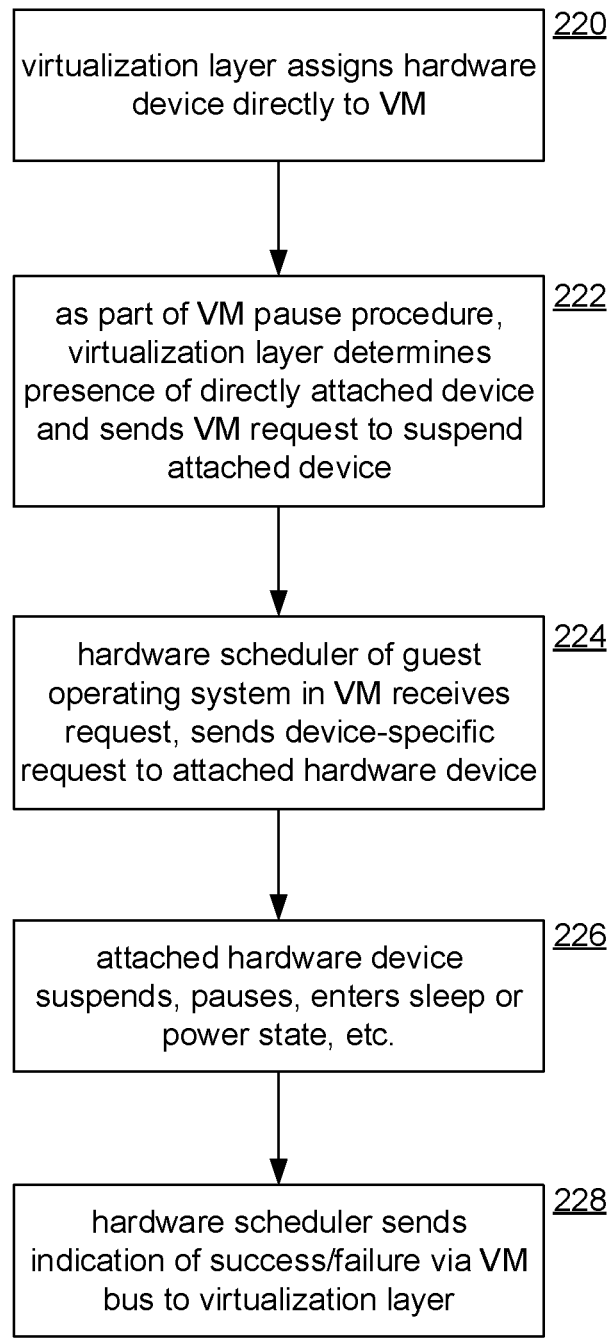
FIG. 5 shows a process corresponding to FIG. 4.

FIG. 5 shows a process corresponding to FIG. 4. As an example, the hardware device 166 will be presumed to be a GPU. At step 220 the virtualization layer assigns the physical GPU device directly to the VM. As noted above, direct assignment may be implemented using the host's hardware bus (e.g., PCI) and the virtualization system's virtual bus (e.g., vPCI). To the target VM and guest operating system, the assigned GPU is just another PCI device.

At step 222, the virtualization layer, perhaps at the initiative of the VM worker process, performs a VM state operation, in this example, a pause operation. In one embodiment, the virtualization layer retains an indication of the assignment of the GPU to the VM and on that basis the virtualization layer uses the PCI/vPCI pathway to inject a request to the guest/VM. In another embodiment, the virtualization layer does not know whether the target VM has directly assigned hardware, assumes it is possible, and sends a blind request to the target VM. The VM/guest receives the blind generic operation request (e.g., pause), ignores it if inapplicable, or if applicable translates it to a vPCI request to the GPU and returns feedback about whether the request was honored by the VM/guest.

At step 224 the hardware scheduler (e.g., a graphics scheduler) acts on the request by issuing a power state change for the GPU on the vPCI of the target VM. The graphics hardware scheduler may also use its scheduling functionality to pause graphics work that is being fed to the GPU. At step 226 the GPU changes power state to effectuate a pause and returns a success or failure code that the hardware scheduler can push, at step 228, onto the VM's vPCI where it is intercepted by the vPCI service in the virtualization layer and passed to the VM worker process which can then decide whether the overall pause operation should proceed, be considered successfully completed, or reversed due to failure.

A guest hardware scheduler, for instance a kernel module or service, that schedules guest use of virtual and/or physical hardware is a useful point of host intervention in the guest because a scheduler is a point of asynchronous control; the scheduler is the arbiter of access, likely already has a queue for queuing requests, etc. A scheduler can therefore do things like hide the absence of a directly assigned device that has been paused, depowered (hot or cold) or otherwise avoid failures due to perhaps temporary unavailability of the relevant hardware device.

Figure 6:
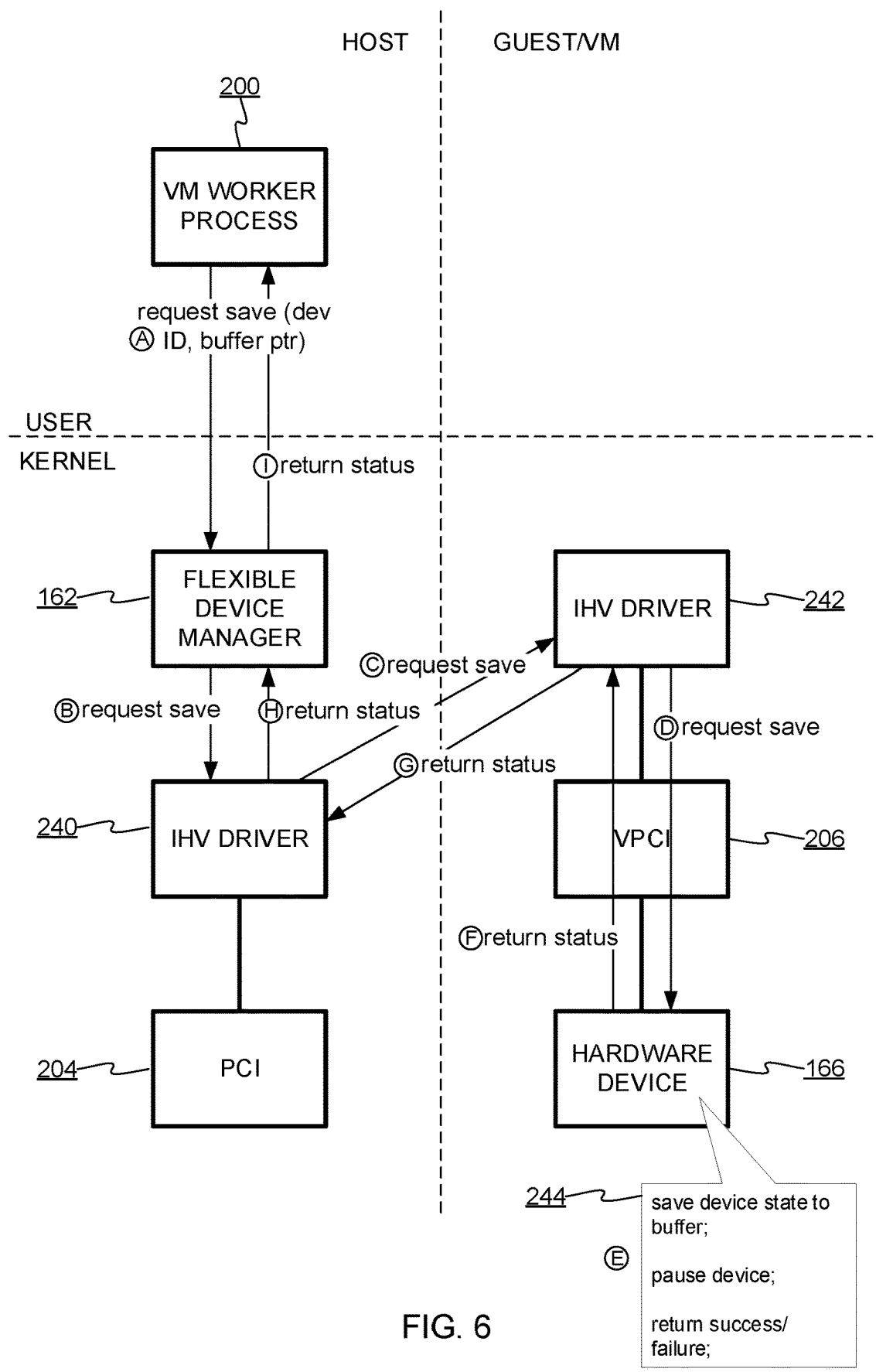
FIG. 6 shows an example of a pause operation performed by driver-to-driver communication.

FIG. 6 shows an example of a pause operation performed by driver-to-driver communication. The drivers may communicate using the virtual bus channel 169 (not to be confused with a virtual bus device of a VM) for VM-to-hypervisor communication. In this example, the VM state operation to be performed on the target VM is saving state of the VM to a buffer. The VM state operation may require, among other things, saving state of the directly attached hardware device, which may be connected to the vPCI device 206 of the target VM. Similar to the state operations above, the VM worker process 200 or an equivalent hypervisor representation of a VM issues a save request to the flexible device manager 162. The request indicates the type of the request, and may also identify the target directly attached hardware device 166. The request may include a memory location pointer or storage address where the target VM will store the hardware state of the hardware device 166.

In this example, there is a host driver 240 on the host (virtualization) side that may be configured to drive the hardware device 166 (although not actually driving it when the device is directly attached to the VM). The same driver or another guest driver 242 compatible with the hardware device 166 communicates with the guest operating system through the vPCI device 206. The drivers are designed to communicate with each other via the virtual bus channel 169. When the host driver 240 receives a request to save state of the hardware device, the host driver 240 signals the guest driver 242. The guest driver 242 sends a request, including perhaps the buffer location received from the virtualization layer, via the vPCI device 206 to the hardware device 166. At step 244, the hardware device 166 performs the requested save operation by storing its hardware state to the provided buffer and providing a return value which traverses back along the same communication pathway. Other types of VM state operations may be implemented using the same technique. For instance, a state restore operation can be performed by passing to the VM/guest the location of the previously stored state of the hardware device 166, which the hardware device 166 uses to restore its previously restored state and resume execution.

It should be noted that a virtual bus is a general-purpose messaging system provided by the virtualization layer to enable flexible message passing per defined commands (perhaps at both the host and the guest sides). Examples include Microsoft's VM Bus, Xen's XenBus, VMWare's VMCI Sockets, to name a few. The virtual bus should not be confused with a virtual bus device of a VM/guest. A virtual bus device (e.g., a vPCI device) is a simulated bus device that resides within a guest. A virtual bus device might rely on the virtualization layer's virtual bus to exchange messages with the host. Furthermore, although a virtual bus may be convenient, any host-guest communication pathway may be leveraged, including network pathways (the host may transmit packets to the guest and an agent in the guest may handle the requests discussed above received via network packets), a private hardware doorbell, a shared memory page directly accessible to host and guest, or others.

Further regarding terminology, the term "virtual machine" is used herein for convenience. The term is considered to also refer to virtualization "partitions" and other equivalents to VMs.

There are other types of operations that a hypervisor may control given a channel to the VM or guest operating system. In most cases, even though a device may be directly assigned, the host may still have the ability to access the device itself. However, doing so without constraint could interfere with the guest's interactions with the device. Even simple polling of the device by the host could create problems. If the host were able to assure that the guest could not be affected, then host interaction with the device would be less problematic. For example, if the host were to put the relevant VM in a sufficiently idle state (not powered down), such as pausing the VM's virtual CPUs, then the host would likely be able to interact with the device without concern for conflict.

Figure 7:
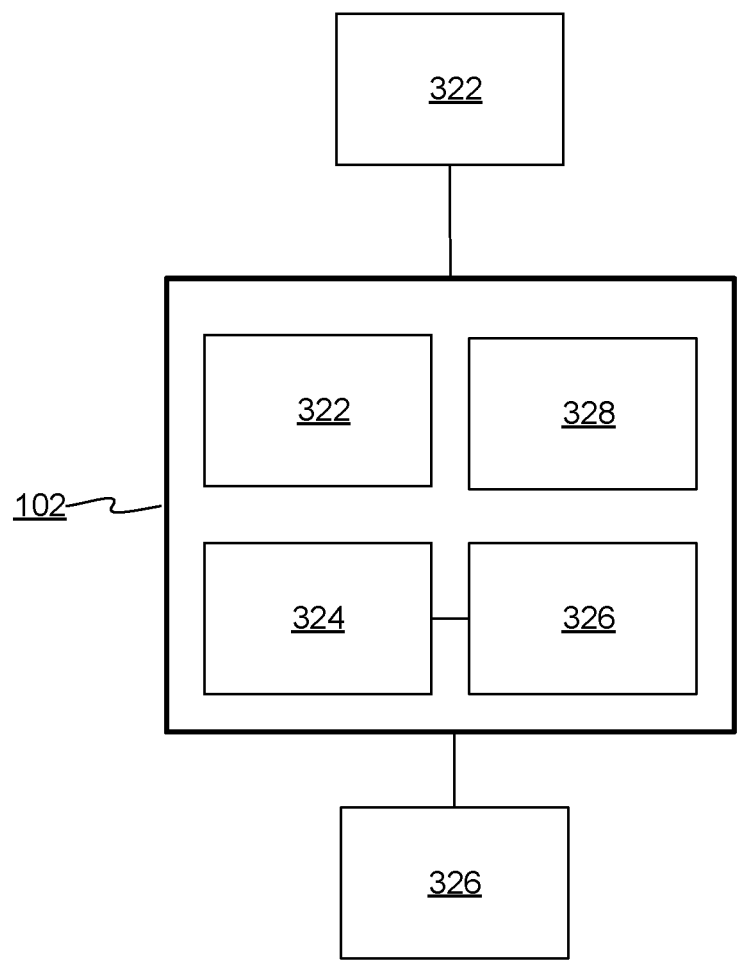
FIG. 7 shows details of the computing device on which embodiments described above may be implemented.

FIG. 7 shows details of the computing device 102 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 220 to implement any of the features or embodiments described herein.

The computing device 102 may have one or more displays 322, a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 102 may cooperate in ways well understood in the art of machine computing. In addition, input devices may be integrated with or in communication with the computing device 102. The computing device 102 may have any form-factor or may be used in any type of encompassing device. The computing device 102 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 228. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computer comprising processing hardware, storage hardware, and a hardware device, the method comprising:

providing a virtualization layer configured to directly assign devices to virtual machines (VMs) managed by the virtualization layer, the virtualization layer comprising a hypervisor, wherein the hardware device is directly assigned to a VM such that the VM accesses the hardware device directly and not through the virtualization layer, the VM comprising a guest operating system to which the hardware device is exclusively attached;

receiving or generating, by the virtualization layer, a first request to perform a state operation on the VM, the state operation related to execution state of the VM;

establishing a communication channel between the virtualization layer and the VM;

while the device remains directly assigned to the VM, passing the first request through the communication channel from the virtualization layer to the VM;

while the device remains directly assigned to the VM, responding, by the guest operating system, to the first request, by signaling the directly attached hardware device, while so attached, to change state in correspondence with the operation.

2. A method according to claim 1, wherein the state operation comprises suspending, saving, or restoring execution state of the VM.

3. A method according to claim 1, wherein the communication channel is established on a virtual machine bus that provides communication channels between VMs and the hypervisor and between VMs, wherein the signaling is performed over a virtual bus device of the guest operating system, wherein communications of the virtual bus device are conveyed by the virtual machine bus, and wherein the method further comprises providing an indication of success or failure of the operation by the hardware device via the communication channel, the virtual bus device mapped to a physical bus by the virtualization layer.

4. A method according to claim 1, further comprising maintaining, by the virtualization layer, assignment information that indicates which hardware devices are directly assigned to which VMs, the assignment information comprising a record that the hardware device has been directly assigned to the VM, and wherein the first request is directed to the VM according to the record in the assignment information.

5. A method according to claim 1, wherein the change state operation signaled to the hardware device comprises a power change state that causes the hardware device to at least partly stop executing, and wherein the state operation on the VM that is performed by the virtualization layer comprises suspending or pausing the VM.

6. A method according to claim 5, further comprising saving state of the hardware device in accordance with the changing state of the hardware device, rebooting the computer, and then resuming execution of the VM by loading the saved state of the hardware device back into the hardware device.

7. A method performed by a computing device comprised of processing hardware and storage hardware, the method comprising:
executing a hypervisor that manages execution of virtual machines (VMs) on the computing device, including a VM to which a hardware device is directly assigned such that the hardware device is directly mapped to the VM and the VM accesses the hardware device directly without intermediation by the hypervisor and while the hypervisor is managing execution of the VM on the processing hardware and storage hardware;
while the hardware device remains directly assigned to the VM, receiving, by the hypervisor, a request to pause and save state of the VM, and in response requesting the VM to pause and save the state of the hardware device; and
while the hardware device remains directly assigned to the VM, responding, by the VM, to the request to pause and save the VM, by a guest operating system of the VM directly instructing the hardware device to pause and save the state of the hardware device.

8. A method according to claim 7, further comprising restoring the VM by passing a location of the saved state from the virtualization layer to the VM and the guest operating system using the location to load the saved state into the hardware device.

9. A method according to claim 7, wherein virtualization layer comprises a first device driver, the guest operating system comprises a second device driver, and wherein the requesting the VM to pause and save the state of the hardware device is requested by the first device driver communicating with the second device driver via a communication channel between the virtualization layer and the VM.

10. A method according to claim 7, wherein the second device driver instructs the hardware device to save its state by sending a signal to the hardware device via a virtual bus device of the VM.

11. A method according to claim 7, further comprising the hypervisor saving state of a virtual device of the VM, and wherein the VM is restored for execution using the saved state of the virtual device and the saved state of the hardware device.

12. A method according to claim 11, wherein the virtual device comprises a virtual CPU.

13. A method according to claim 7, wherein the second driver communicates with the hardware device via a virtual bus device of the VM that is backed by a physical bus device of the computing device as managed by the hypervisor.

14. A method according to claim 7, wherein the request to pause comprises a buffer location and a device identifier of the hardware device.

15. A computer comprising:
processing hardware;
storage hardware storing, for execution by the processing hardware, a virtual machine (VM) and a virtualization layer;
the VM comprising a guest operating system;
the virtualization layer comprising a hypervisor and a communication channel configured to provide communication between the VM and the hypervisor, the virtualization layer configured to directly assign a hardware device to the VM such that the hardware device is used exclusively by the VM without going through the hypervisor;
the virtualization layer configured to, while the hardware device remains directly assigned to the VM, send a request through the communication channel to the VM while the hardware device is directly assigned to the VM; and
the VM configured to, while the hardware device remains directly assigned to the VM, respond to the request by the guest operating system signaling the directly-assigned hardware device to pause execution, save its state, load state, or resume execution.

16. A computer according to claim 15, wherein while the hardware device is directly assigned to the VM the guest operating system uses the hardware device without virtualization abstraction or without intermediation by the hypervisor.

17. A computer according to claim 15, wherein the operating system comprises a hardware scheduler or a device driver that communicates with the hardware device to signal the hardware device.

18. A computer according to claim 15, wherein the virtualization layer comprises a virtual bus for arbitrary communication between the hypervisor and arbitrary VMs managed by the hypervisor.

19. A computer according to claim 15, wherein the virtualization layer further comprises a device tracker configured to track which VMs have hardware devices directly assigned thereto.

20. A computer according to claim 15, wherein the computer reboots while the directly-assigned hardware device is paused or suspended.

* * * * *